United States Patent
Bahr et al.

[11] Patent Number: 5,197,200
[45] Date of Patent: Mar. 30, 1993

[54] DEVICE FOR THE MEASUREMENT OF THE DIAMETER OF CYLINDERS

[75] Inventors: Theodor Bahr, Heidenheim; Peter Biener, Herbrechtingen; Gerd Krattenmacher, Stuttgart-Weilimdorf, all of Fed. Rep. of Germany

[73] Assignee: J.M. Voith GmbH, Heidenheim, Fed. Rep. of Germany

[21] Appl. No.: 819,271

[22] Filed: Jan. 10, 1992

[30] Foreign Application Priority Data

Jan. 11, 1991 [DE] Fed. Rep. of Germany ....... 4100615

[51] Int. Cl.$^5$ .................. G01B 3/12; G01B 7/28
[52] U.S. Cl. .......................... 33/555.1; 33/773
[58] Field of Search ..................... 33/555.1, 773

[56] References Cited

U.S. PATENT DOCUMENTS

| 3,172,208 | 3/1965 | Lowy | 33/773 |
| 4,700,484 | 10/1987 | Frank et al. | 33/555.1 |

FOREIGN PATENT DOCUMENTS

| 1918108 | 10/1969 | Fed. Rep. of Germany | 33/555.1 |
| 2048682 | 4/1972 | Fed. Rep. of Germany | 33/555.1 |
| 1427548 | 4/1966 | France | |

Primary Examiner—Harry N. Haroian
Attorney, Agent, or Firm—Baker & Daniels

[57] ABSTRACT

A device for the measurement of the diameter of a body such as a cylinder, more particularly in the form of a workpiece on a roll grinding machine, having a contact wheel adapted to run on the surface of the body and a first rotational pickup (angle encoder) centrally coupled with or provided with a the contact wheel, and a second rotational pickup, which is adapted to indicate at least full revolutions of the body. The cylinder is coupled with the second rotational pickup (angle encoder), which like the first rotational pickup has high pulse rate for each measurement operation one respective start pulse and end pulse of one of these two pickups is utilized in order, with corresponding pulses of the other of the pickup, to calculate the diameter of the roll. A computer is provided which, by interpolation in each measurement operation of the registered pulses of at least one of the pickups, produces at least one intermediate pulse series with increments, which are respectively smaller than the fixed increments of the one pickup, of which one corresponds with such accuracy to the one end measurement pulse received approximately simultaneously of the one or normal pulse series of the other rotational pickup.

11 Claims, 2 Drawing Sheets

Fig. 2
Fig. 3
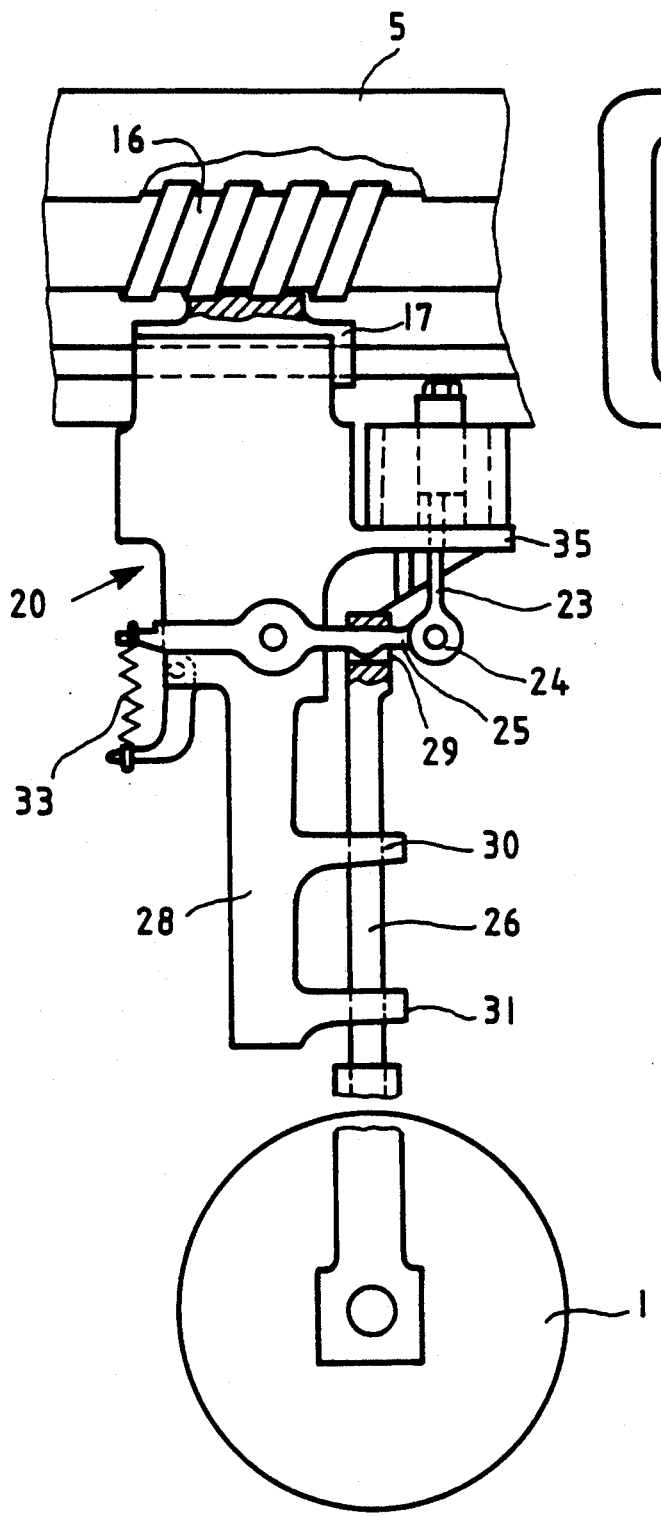
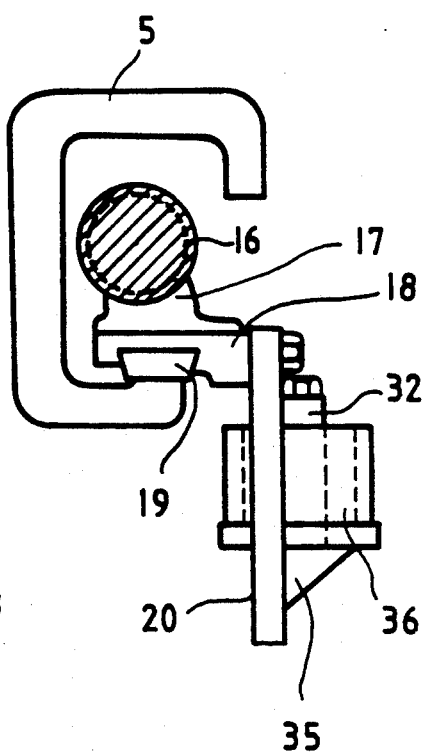

DEVICE FOR THE MEASUREMENT OF THE DIAMETER OF CYLINDERS

BACKGROUND OF THE INVENTION

The present invention relates to a device for the measurement of the diameter of cylinders, and more particularly in a machine tool such as a roll grinding machine Such a device is disclosed in the French patent 1,427,548, wherein a rotational pickup is provided that is coupled with a contact wheel, which is adapted to run on the surface of the cylinder. This contact wheel is bearinged on a rotary, rod-like carrier, which has a pulse device that produces one pulse for each rotation of the rod, the rod consisting of a magnet coupled with the rod, a stationary magnet, and transmission and indicating devices. In this case, practically only complete rotations of the rod are detected and on the basis of the number of pulses, which occur during these detected revolutions at the rotational pickup, the diameter (preferably the internal one) of the cylinder, which remains stationary, is measured. This method of measurement is naturally relatively inaccurate and has a slow response. Furthermore it has the substantial disadvantage that a very large number of rotations of the contact wheel are used in each measurement operation for the calculation of the cylinder diameter, any error in the measured or known diameter of the friction wheel being multiplied.

In this respect it is moreover a question of a machining device resembling a drilling machine and apparently intended for the production of relatively small holes using a simple bar-like cutting tool.

One object of the present invention is to provide a measurement device that has an extremely high accuracy of at least ± 0.002 mm and, preferably of ±0.001 mm, in the case of cylinder diameters of between 200 and 3000 mm.

SUMMARY OF THE INVENTION

A device for the measurement of the diameter of a body such as a cylinder, more particularly in the form of a workpiece, on a roll grinding machine, the device comprising a contact wheel adapted to run on the surface of the body, a first rotational pickup centrally coupled with or provided with the contact wheel, and a second rotational pickup which is adapted to indicate at least full revolutions of the body. Each measurement operation involves the use of at least one respective start pulse and end pulse of the first and second rotational pickup in order to calculate the diameter of the body, whereby the second rotational pickup, like the first rotational pickup, has a high pulse rate. For each measurement operation one respective start pulse and end pulse of one of the two pickups is utilized in order, with corresponding pulses of the second pickup, to calculate the diameter of the body. A computer is provided which, by interpolation in each measurement operation of the registered pulses of at least one of the pickups and preferably that of the body, produces one intermediate pulse series with increments which are respectively smaller than the fixed increments of the one pickup, of which one corresponds with such accuracy to the one end pulse received approximately simultaneously of the one intermediate or normal pulse series of the other rotational pickup that for the input into a central processing unit of the computer a degree of progression, constituted by angle increments of the roll and relating to the roll periphery on the one hand and on the other hand a peripheral extent corresponds to this degree of progression, constituted by angle increments ($i_r$) of the first rotational pickup of the contact wheel, multiplied by a peripheral extent ($s_r$) corresponding to one of these angle increments ($i_r$) of the same, for the calculation of the cylinder diameter on the basis of local peripheral velocity, so determined, of the cylinder surface, of the angular velocity of the cylinder and of the known contact wheel diameter in accordance with the equation $$D = i_r s_r / \pi \cdot \omega_w \Delta t$$

wherein $i_r$ is equal to the number of the measurement pulses (increments) of the contact wheel in the time period $\Delta t$ and $\omega_w$ is equal to the angular velocity of the body in the respective individual measurement operation.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 shows an arrangement in accordance with the present invention on a larger scale with an elevational and partial sectional view of the cylinder; and FIG. 3 is a partially sectioned view of the carrying arm assembly.

DESCRIPTION OF THE PREFERRED EMBODIMENT

Figure 1:
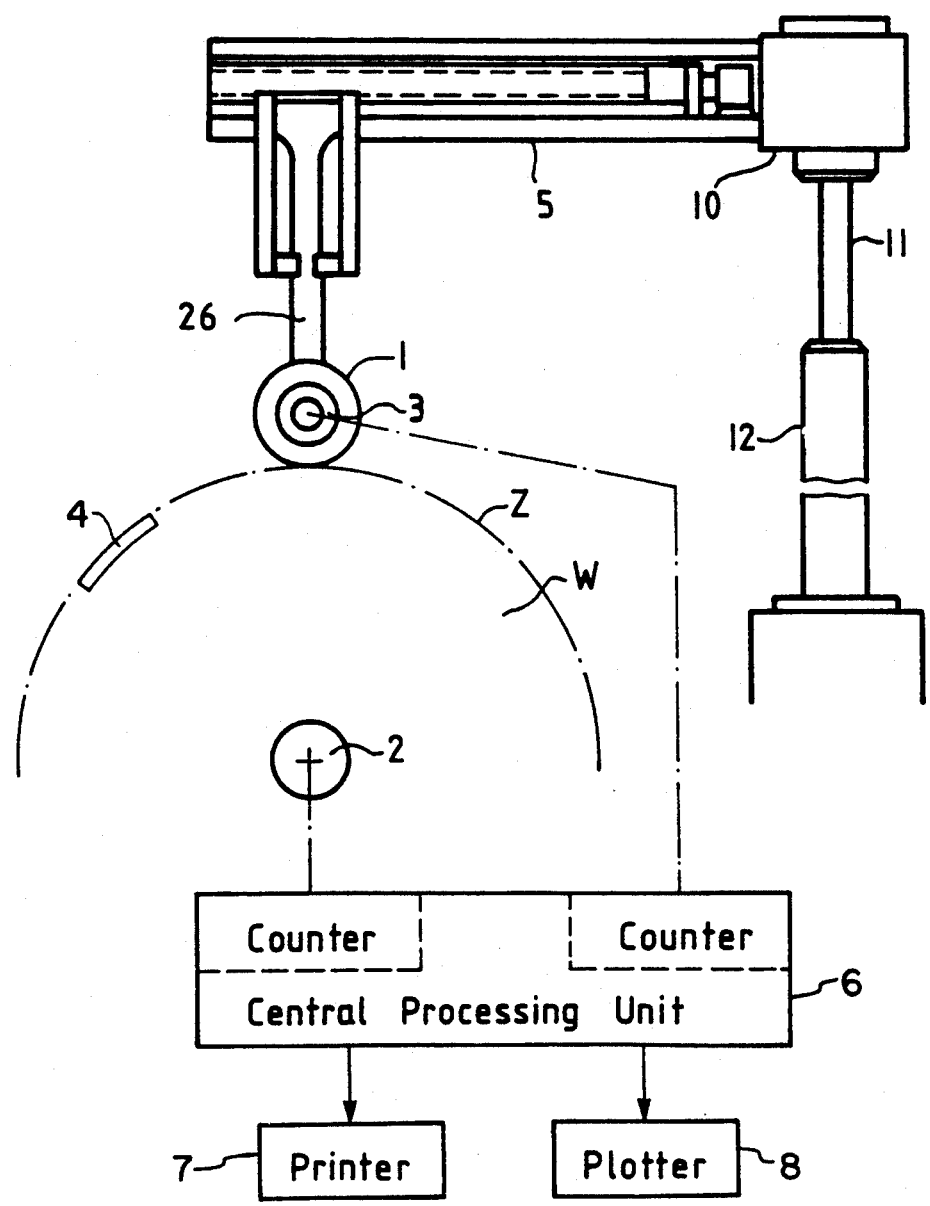
FIG. 1 shows in principle an arrangement in accordance with the present invention generally in a transverse view.

In FIG. 1, the cylinder or the roll is indicated in broken lines at W while the rotational pickup coupled with the cylinder is indicated at 2. The contact wheel 1 running on the cylinder is also coupled with a rotational pickup 3 as indicated. The wheel is borne by a holding bar 26 which in the present case extends substantially vertically downwards and which is able to run generally in a horizontal direction on a carrying arm 5. This carrying arm is so pivoted by means of a pivot bearing 10 on an output rod 11 of a reciprocating cylinder 12 that the contact wheel 1 is capable of vertical adjustment in relation to the respective diameter of the cylinder or of the roll. By means of the horizontally running holding means, it is possible for the contact wheel to be exactly set at the uppermost point of the cylinder.

Preferably in a given time period, that is to say between two timing pulses, the distance run by the contact wheel 1 and the angular progression of the roll W are simultaneously detected by means of rotational pickups 2 and 3. The pickups preferably produce a large number of pulses of between 10,000 and for instance, 30,000 for each rotation thereof. The pulses or increments of the rotational pickups 2 and 3 are preferably fed to a computer 6, which sets the point of starting (initiation of counting) and the end point (end of counting) of the pulses, the operator being able to preset the interval between the start and end in accordance with the desired accuracy, as for instance corresponding to 30°, 90°, 360° on the cylinder or the roll W.

In the event of a very high accuracy of measurement being desired, for instance ±0.002 mm or even ±0.001 mm, there is the problem that even in the case of a very high resolution (i.e. the number of increments per revolution of the rotational pickup) both at the start and at the end point of the measurement, the rotational pulse signals will not arrive synchronously at the computer so that there will be unacceptably large errors. The present invention has the aim of bringing these errors down to an acceptable level.

According to the present invention this aim is conveniently achieved if the increments, which come from the pickup 3 (contact) wheel, set the start and end points of the measurement and the increments, which come from pickup 2 on the roll, are increased by the computer 6 by interpolation, for instance by a factor of 10. After the last increment coming directly from the computer 6, it is also possible to produce smaller increments within the increment step size, that is to say in the otherwise following "normal" increment It is in this manner that the present invention ensures that at a predetermined end point in the time of the measurement, a measurement pulse (the end of the last measurement increment) from the rotational pickup 3 of the contact wheel 1 coincides with a pulse to be associated with the roll W by interpolation performed by the computer 6. Thus in this manner it is possible to achieve the necessary high degree of accuracy.

The equation for the calculation of the external cylinder diameter D is as follows $$D = i_r s_r / \pi \cdot \omega_w \cdot \Delta t$$

wherein $$\omega_w = \frac{i_w}{i_{wo} \cdot \Delta t_1}$$

in which $i_w$ is equal to the number of roll measurement pulses, $i_{wo}$ is the pulse rate or number of pulses from the rotational pickup (2), on the roll, $i_r$ is equal to the number of measurement pulses (increments) from rotational pickup 3 of the contact wheel 1 in the time period $\Delta t$, and $\omega_w$ is equal to the angular velocity of the cylinder concerned in the respective individual measurement step.

For practical purposes the speed v of the cylinder (roll) surface Z is detected by the friction wheel $(v = i_r s_r / \Delta t)$.

It is also naturally possible to use the increments originating from the cylinder, such as a roll or some other cylindrical workpiece, as a basis increment and to supplement those from the measurement wheel by the computer in an interpolating manner. However, it is convenient to perform interpolation on the workpiece side (i.e. the roll), because the angular velocity thereof is sufficiently constant owing to the drive (by an electric motor) and to the inertia of the roll, and is equal to between 3 and $30^{-1}$. Moreover a corresponding interpolation of both signals is possible, but it is not absolutely essential.

By deriving the average, the computer is able, for instance, to provide the degree of progression of the surface of the roll (rotation of the cylinder) for 6 to 10 or 15 increments with a spacing of for instance 10 or 20 increments from an initial pulse (starting pulse). Directly after this the measurement is performed with the contact wheel and the above equation is utilized to calculate the cylinder diameter D. This is on the basis that during this measurement time, as a whole the speed of rotation of the cylinder is absolutely constant. If however a measurement is performed over, for instance, only 30° of the periphery of the cylinder, this condition will readily be complied with. It is naturally also possible to perform both measurements almost simultaneously and cause the computer to evaluate them.

Above, it has been assumed that under certain conditions only angular progressions of the cylinder of between 30° and 90° are utilized in a measuring operation. However, to be convenient the method of measurement stated above is preferred.

In this manner it is possible to achieve the necessary accuracy in the case of cylinder diameters of up to 3000 mm.

It is naturally clear that the diameter of the contact wheel 1 must be known very accurately and therefore has to have been measured beforehand. In fact, the matter is such that the diameter of this contact wheel is substantially smaller than that of the roll so that the error between the desired and actual diameters of the friction wheel becomes multiplied during measurement.

Therefore there is preferably also a provision for temperature compensation if it is impossible to work in a room with temperature control for the production of the friction wheel. A temperature measuring device 4 is included here, which is integrated in the roll. Be means of a previously established temperature correction factor table it is possible for such temperature variations to be allowed for by the computer 6.

Preferably the friction wheel is also manufactured of a material which has exactly the same coefficient of thermal expansion as the cylinder to be machined or to be measured.

Furthermore the measuring operations may be performed a number of times using a computational routine such that it is possible for the computer 6 to produce a three-dimensional representation of the roll diameters. These values may then be printed 7 or fed to a plotter 8 connected with the computer 6 for recording as a hard copy. This operation may naturally be performed with a time delay in relation to the individual measurement operations. If the error due to inaccuracies in the diameter of the contact wheel is to be reduced, it is possible for the diameter of the same to be made comparatively very large.

As shown in FIG. 2 a device is provided in the case of which the weight of the contact wheel 1 and its holder do not play a substantial role, for the contact pressure between the contact wheel and the cylinder surface and therefore the diameter of the contact wheel may be made relatively large. In this case the weight of the contact wheel and its holder will be canceled out and the load pressure will be produced by a lever with inductive operation. FIG. 3 is a section showing the carrying arm 5 for the contact wheel and a lead screw 16 for horizontal displacement of the holding device of the same. The lead screw 16 has a drive screw thread and a mating member 17 arranged opposite to it for meshing engagement therewith. As shown in FIG. 3, this mating member is connected with a guide plate 18, which is slidingly mounted on a guide track 19 of the holding arm 5. The guide plate 18 furthermore bears a guide piece 20, which on one arm 28 carries guide booms 30 and 31 for guiding the holding rod 26 of the friction wheel 1. On a bracket 35 the guide member 20 bears a magnet arrangement with a magnet 36 and a magnetic core 32. The magnetic core is connected with a plunger 23 which at the pivot point 24 is pivotally connected with a first class lever 25. This lever is loaded or biased at its other end by spring 33. The first lever arm 25 bears the holding rod 26 of the friction wheel in a recess 29 of the holding rod 26. The weight of the friction wheel and of the holding rod is balanced or overcome by the spring 33 in relation to the cylinder which is to be measured and the pressing thrust of the friction wheel is produced by the inductive forces of the magnet arrangement. The necessary electrical leads are not illustrated.

The preferred field of application of the invention is the production of plain or crowned rolls on roll grinding machines in order to grind the roll very accurately to the desired diameter. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for the measurement of the diameter of a body such as a cylinder, more particularly in the form of a workpiece, on a roll grinding machine, the device comprising:
   a contact wheel adapted to run on the surface of the body,
   a first rotational pickup having a high pulse rate and centrally coupled with or provided with the contact wheel; and
   a second rotational pickup having a high pulse rate which is adapted to indicate at least full revolutions of the body;
   wherein each measurement operation involves the use of a respective start pulse and end pulse of one of said pickups in order to calculate the diameter of the body;
   whereby for each measurement operation the respective start pulse and end pulse of said one of said pickups is utilized with corresponding pulses of the other of said pickups, and in that a computer is provided which, by interpolation in each measurement operation of the registered pulses of said other of said pickups produces at least one intermediate pulse series with increments which are respectively smaller than fixed increments of said one of said pickups, of which one pulse corresponds with such accuracy to the one end pulse received approximately simultaneously of the intermediate pulse or normal pulse series of the other of said pickups that for the input into a central processing unit of the computer a degree of progression, constituted by angle increments of the roll and relating to the roll periphery on the one hand and on the other hand a peripheral extent corresponding to this degree of progression, constituted by angle increments ($i_r$) of the first rotational pickup, multiplied by a peripheral extent ($s_r$) corresponding to one of these angle increments ($i_r$) of the same are provided for the calculation of the cylinder diameter on the basis of local peripheral velocity (v), so determined, of the cylinder surface, of the angular velocity of the cylinder, and of the known contact wheel diameter in accordance with the equation;

$$D = i_r s_r / \pi \cdot \omega_w \cdot \Delta t$$

wherein $i_r$ is equal to the number of the measurement increments of the contact wheel in the time period $\Delta t$, and $\omega_w$ is equal to the angular velocity of the body in the respective individual measurement operation.

2. A device for the measurement of a cylinder and more particularly of a roll, on a roll grinding machine, the device comprising:
   a contact wheel adapted to run on the surface of the cylinder and centrally coupled or provided with a rotational pickup; and
   a pulse generating pickup, which provides at least one pulse for each revolution of the cylinder;
   wherein for each measurement operation one start and one end pulse of one of the rotational pickup and of the pulse generating pickup are utilized to calculate the diameter, whereby the cylinder is coupled with the pulse generating pickup, and that an electronic computer is provided in order to ascertain the peripheral velocity (v) of the cylinder in accordance with the equation $$v = i_r s_r / \Delta t$$

preferably by interpolation, or by the derivation of a mean value and the detection of pulses from the pulse generating pickup coupled with the cylinder for a certain period of time and for the calculation of the cylinder diameter (D) in accordance with the equation $$D = v / \pi \cdot \omega_w$$

wherein $i_r$ is equal to the number of pulses of the contact wheel in the period of time $\Delta t$, and $\omega_w$ is equal to the angular velocity of the cylinder in the respective individual measurement operation.

3. The device as claimed in claim 1, wherein the number of pulses added by the computer by interpolation is sufficient for an accuracy of ±0.002 mm and preferably of ±0.001 mm in the case of cylinder diameter of between 200 and 3000 mm.

4. The device as claimed in claim 1, wherein the contact wheel is provided with a temperature measuring means for temperature compensation of its diameter by correction factors.

5. The device as claimed in claim 2, wherein the contact wheel is provided with a temperature measuring means for temperature compensation of its diameter by correction factors.

6. The device as claimed in claim 3, wherein the contact wheel is provided with a temperature measuring means for temperature compensation of tis diameter by correction factors.

7. The device as claimed in claim 1, including a computer routine for the three-dimensional representation of the roll by means of a respective local diameter of the roll using a printer and/or a plotter.

8. The device as claimed in claim 2, including a computer routine for the three-dimensional representation of the roll by means of a respective local diameter of the roll using a printer and/or a plotter.

9. The device as claimed in claim 3, including a computer routine for the three-dimensional representation of the roll by means of a respective local diameter of the roll using a printer and/or a plotter.

10. The device as claimed in claim 4, including a computer routine for the three-dimensional representation of the roll by means of a respective local diameter of the roll using a printer and/or a plotter.

11. A method for the measurement of the diameter of a body such as a cylinder, more particularly in the form of a workpiece, on a roll grinding machine, the method comprising:

providing a contact wheel adapted to run on the surface of the body, providing a first rotational pickup having a high pulse rate and centrally coupled with or provided with the contact wheel; and providing a second rotational pickup having a high pulse rate and which is adapted to indicate at least full revolutions of the body;

wherein each measurement operation involves the use of a respective start pulse and end pulse of one of said pickups in order to calculate the diameter of the body;

whereby for each measurement operation the respective start pulse and end pulse of said one of said pickups is utilized with corresponding pulses of the other of said pickups and in that a computer is provided which, by interpolation in each measurement operation of the registered pulses of said other of said pickups produces at least one intermediate pulse series with increments which are respectively smaller than fixed increments of said one of said pickups, of which one pulse corresponds with such accuracy to the one end pulse received approximately simultaneously of the intermediate pulse or normal pulse series of the other of said pickups that for the input into a central processing unit of the computer a degree of progression, constituted by angle increments of the roll and relating to the roll periphery on the one hand and on the other hand a peripheral extent corresponding to this degree of progression, constituted by angle increments ($i_r$) of the first rotational pickup, multiplied by a peripheral extent ($s_r$) corresponding to one of these angle increments ($i_r$) of the same are provided for the calculation of the cylinder diameter on the basis of local angular velocity, so determined, of the cylinder surface, of the peripheral velocity (v) of the cylinder, and of the known contact wheel diameter in accordance with the equation $$D = i_r s_r / \pi \cdot \omega_w \cdot \Delta t$$

wherein $i_r$ is equal to the number of the measurement increments of the contact wheel in the time period $\Delta t$, and $\omega_w$ is equal to the angular velocity of the body in the respective individual measurement operation.

* * * * *